(12) United States Patent
Xenopoulos et al.

(10) Patent No.: US 8,282,732 B2
(45) Date of Patent: Oct. 9, 2012

(54) USE OF AT LEAST ONE CELLULOSE ETHER TO REDUCE PLASTIC SHRINKAGE AND/OR CRACKING IN CONCRETE

(75) Inventors: Constantinos Xenopoulos, Villeurbanne (FR); Isabelle Sgro, Bourgoin-Jallieu (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 13/127,315

(22) PCT Filed: Jul. 10, 2009

(86) PCT No.: PCT/FR2009/000858
§ 371 (c)(1),
(2), (4) Date: May 3, 2011

(87) PCT Pub. No.: WO2010/055214
PCT Pub. Date: May 20, 2010

(65) Prior Publication Data
US 2011/0203488 A1 Aug. 25, 2011

(30) Foreign Application Priority Data
Nov. 14, 2008 (FR) ..................... 08 06348

(51) Int. Cl.
*C04B 24/38* (2006.01)
*C04B 24/10* (2006.01)
*C04B 103/00* (2006.01)

(52) U.S. Cl. ........................... 106/805; 106/730

(58) Field of Classification Search ............... 106/730, 106/805
See application file for complete search history.

(56) References Cited

U.S. PATENT DOCUMENTS

| 4,462,836 | A  | * | 7/1984 | Baker et al. .................. 106/720 |
| 7,288,149 | B2 | * | 10/2007 | Rydgren et al. ............. 106/730 |
| 2005/0241543 | A1 |  | 11/2005 | Hagen et al. |
| 2008/0196629 | A1 | * | 8/2008 | Yamakawa et al. .......... 106/730 |

FOREIGN PATENT DOCUMENTS

| EP | 1 964 826 A2 | 9/2008 |
| JP | 55-102665 A * | 8/1980 |
| JP | 60-204651 A * | 10/1985 |
| KR | 10-0824116 | 4/2008 |

OTHER PUBLICATIONS

Derwent-Acc-No. 1986-144394, abstract of AU 854169A (Apr. 1986).*
International Search Report for PCT/FR2009/000858, [Feb. 2010].
Pourchez et al.; "HEC influence on cement hydration measured by conductometry", Cement and Concrete Research, vol. 36, 2006, pp. 1777-1780.
"Hydroxyethyl methylcellulose with a methoxyl DS of 0.01-0.5 and a hydroxyethoxyl MS of 0.8-2.5"; Research Disclosure, Mason Publications, Hampshire, Great Britain, vol. 198, No. 8, Oct. 1, 1980.

* cited by examiner

*Primary Examiner* — Anthony J Green
(74) *Attorney, Agent, or Firm* — Pillsbury Winthrop Shaw Pittman, LLP

(57) ABSTRACT

A method includes adding in a concrete composition at least one cellulose ether having either, a degree of substitution of methoxy radicals (DSM); or a degree of substitution (DS) comprised from 1.17 to 2.33 to reduce plastic shrinkage and/or reduce plastic cracking in concrete.

21 Claims, 3 Drawing Sheets

Figure 1:
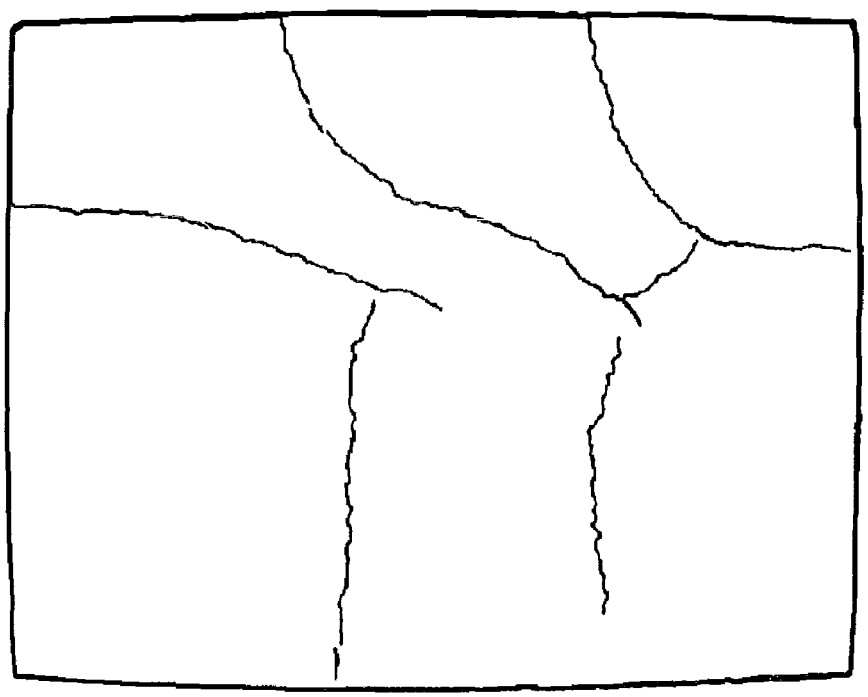

USE OF AT LEAST ONE CELLULOSE ETHER TO REDUCE PLASTIC SHRINKAGE AND/OR CRACKING IN CONCRETE

CROSS-REFERENCE TO RELATED APPLICATIONS

This is the U.S. National Stage of PCT/FR2009/000858, filed Jul. 10, 2009, which in turn claims priority to French Patent Application No. 0806348, filed Nov. 14, 2008, the entire contents of all applications are incorporated herein by reference in their entireties.

The present invention relates to the use of at least one cellulose ether to reduce or eliminate plastic shrinkage and/or plastic cracking in concrete.

Concrete may indeed have shrinkage and/or cracking in its structure at different stages of its elaboration:

Shrinkage and/or cracking before or during the setting process of the concrete (plastic shrinkage and/or cracking);

Shrinkage and/or cracking during the hardening process of the concrete (drying shrinkage and/or cracking).

The use of additives or mixes of additives is known to improve the mechanical performances of concretes or improve the rheology of compositions with a base of hydraulic binders.

For example, the use of curing compounds is known (for example acrylic or vinyl polymers) to reduce plastic shrinkage and/or plastic cracking of hydraulic binder compositions, for example concrete. Due to important shrinkage, concrete indeed tends to develop cracks. These cracks have the drawback of fragilizing the concrete and altering its mechanical and aesthetic performances. Furthermore, climate conditions, for example humidity or temperature, accelerate the growth of these cracks when they are present, and damage the concrete. One main function of curing compounds is to reduce plastic cracking and retard its propagation through the matrix of the concrete. As a result of the reduction or elimination of plastic shrinkage and/or plastic cracking, the life span of concrete improves.

However, curing compounds are not entirely satisfactory because they require being sprayed on the surface of the concrete after pouring, which adds a supplementary step in the placing process of the concrete. Furthermore, the efficiency of the curing compound depends on the homogeneity of this product during the spraying operation, which is to say, the average quantity of product per square meter, making it difficult to use on jobsites.

In order to respond to users' requirements, it has become necessary to find another means of eliminating or reducing plastic shrinkage and/or plastic cracking in concrete.

Therefore, the problem which the invention intends to solve is to provide a new means adapted to reduce or eliminate plastic shrinkage and/or plastic cracking in concrete.

Unexpectedly, the inventors have shown that it is possible to use at least one cellulose ether having either, a degree of substitution of methoxy radicals (DSM); or
a degree of substitution (DS)
comprised from 1.17 to 2.33.

With this aim the present invention proposes the use of at least one cellulose ether having either, a degree of substitution of methoxy radicals (DSM); or
a degree of substitution (DS)
from 1.17 to 2.33 to reduce plastic shrinkage and/or reduce plastic cracking in concrete.

The present invention also relates to a concrete comprising from 0.05 to 0.8% of at least one cellulose ether (% by dry mass of cellulose ether relative to the dry mass of cement) as an additive to reduce plastic shrinkage and/or or reduce plastic cracking.

The invention offers determining advantages, in particular because cellulose ethers may be introduced directly into the concrete, in particular into concrete in the drum truck, or into the constituents of concrete in dry form, for example in powder form. This is very advantageous relative to other additives which require being sprayed on the surface of the concrete after pouring. The use according to the invention indeed facilitates the implementation of the concrete on the jobsite since the treatment step after pouring is eliminated.

Advantageously, concrete containing a cellulose ether according to the invention is a fluid or self-placing concrete (or self-compacting or self-levelling).

The invention offers another advantage in that the compounds according to the invention may eliminate plastic shrinkage and/or plastic cracking in concrete compositions.

Another advantage of the present invention is that the cellulose ethers used according to the invention disperse well in concrete compositions.

Furthermore, the cellulose ethers used according to the invention offer the advantage of giving performances which are not very sensitive to the chemical nature of the concrete.

Finally, the invention has the advantage of being able to be used in all industries, in particular the building industry, the cement industry and in all the construction markets (building, civil engineering or pre-cast plants).

Other advantages and characteristics of the invention will clearly appear after reading the following description and examples provided for non-limiting illustration purposes.

The expression <<hydraulic binder>>, is to be understood according to the present invention as any compound which has the property of becoming hydrated in the presence of water and the hydration of which makes it possible to obtain a solid having mechanical characteristics. The hydraulic binder according to the invention may in particular be a cement. Preferably, the hydraulic binder according to the invention is a cement.

The term <<concrete>>, is to be understood as a mix of hydraulic binders, aggregates, water, optionally additives, and optionally mineral additions, for example high performance concrete, very high performance concrete, self-placing concrete, self-levelling concrete, self-compacting concrete, fibre concrete, ready-mix concrete or coloured concrete. The term <<concrete>>, is also to be understood as concretes having been submitted to a finishing operation, for example bush-hammered concrete, exposed or washed concrete or polished concrete. Pre-stressed concrete is also to be understood by this definition. The term <<concrete>> comprises mortars, in this specific case concrete comprises a mix of hydraulic binder, sand, water and optionally additives. The term <<concrete>> according to the invention denotes indistinctly fresh concrete or hardened concrete.

The term <<aggregates>> is to be understood according to the invention as gravel and/or sand.

The term <<mineral additions>> is to be understood according to the invention as slag (as defined in the <<Cement>> NF EN 197-1 Standard, paragraph 5.2.2), pozzolanic materials (as defined in the <<Cement>> NF EN 197-1 Standard, paragraph 5.2.3), fly ash (as defined in the <<Cement>> NF EN 197-1 Standard, paragraph 5.2.4), shale (as defined in the <<Cement>> NF EN 197-1 Standard, paragraph 5.2.5), limestone (as defined in the <<Cement>> NF EN 197-1 Standard, paragraph 5.2.6) or silica fume (as defined in the <<Cement>> NF EN 197-1 Standard, paragraph 5.2.7).

The expression <<fluid concrete>>, is to be understood as a concrete being easy to be used. The workability of fluid concretes is measured by the height of the slump using the Abrams cone—or slump value— (according to the French NF P 18-451 Standard, of December 1981) and a concrete is considered to be fluid when this slump is at least 150 mm, preferably at least 180 mm.

The expression <<self-placing concrete>> or <<self-compacting concrete>> or <<self-levelling concrete>>, is to be understood according to the present invention as a fluid concrete, placed by gravity, without requiring vibration. The workability of self-placing concretes (or self-compacting or self-levelling concretes) is generally measured from the "slump flow" or spread, according to the operating procedure described in the document, "Specification and Guidelines for Self Compacting Concrete, EFNARC, February 2002, p. 19-23"; the value of the spread is greater than 650 mm for self-compacting concretes (and in general lower than 800 mm).

The term <<setting>>, is to be understood according to the present invention as the passage to the solid state by chemical reaction of binder hydration. The setting is generally followed by a hardening period.

The term <<hardening>>, is to be understood according to the present invention as the acquisition of mechanical properties of a hydraulic binder, after the end of the setting process.

The term <<cracking>>, is to be understood according to the present invention as a fracture or a failure of a material, which results or not in the separation of the said material in at least two distinct pieces.

The term <<cracking>>, is to be understood according to the present invention as the appearance of cracks.

The term <<cure>>, is to be understood according to the present invention as protection of the concrete against too rapid dessication during its setting process and during the first days of its hardening process. The surface of the concrete may be kept humid by wetting or by protection using straw matting, damp bags, water-proof sheets, or by spraying a curing compound after the pouring of the concrete.

The term <<shrinkage>>, is to be understood according to the invention as the decrease of volume of the concrete.

The expression <<plastic shrinkage>>, is to be understood according to the invention as the decrease of volume of the concrete during the setting process.

The expression <<plastic cracking>>, is to be understood according to the invention as the appearance of cracks during the setting process.

The expression <<drying shrinkage>>, is to be understood according to the invention as the decrease of volume of the concrete during the hardening process.

The expression <<drying cracking>>, is to be understood according to the invention as the appearance of cracks during the hardening process.

The term <<plastic>>, is to be understood according to the invention as the state of the concrete before and during the setting process.

The expression <<elements for the construction field>> is to be understood according to the present invention as any element constituting a construction, for example a floor, a screed, a foundation, a wall, a partition wall, a ceiling, a beam.

The expression <<degree of substitution (DS)>>, is to be understood according to the invention as the average number of hydroxyls reacting per unit of glucose. The value of the DS may vary from 0 to 3.

The expression <<degree of substitution of methoxy radicals (DSM)>>, is to be understood according to the invention as the average number of methoxy substitutes per unit of glucose. The value of the DSM may vary from 0 to 3.

The expression <<molar substitution (MS)>>, is to be understood according to the present invention as the average number of moles of monomer reacting per mole of glucose unit. The value of the MS may vary from 0 to 1.

The invention relates to the use of at least one cellulose ether having either,
 a degree of substitution of methoxy radicals (DSM); or
 a degree of substitution (DS)
 from 1.17 to 2.33 to reduce plastic shrinkage and/or reduce plastic cracking in concrete.

Surprisingly, the reduction of plastic shrinkage and/or the reduction of the plastic cracking in concrete is obtained without increasing water retention in the concrete during its setting process and during the first days of its hardening process compared to a concrete not containing the cellulose ether according to the invention. In other words, the cellulose ether according to the invention does not have an improving effect on water retention even though it induces a reduction of the plastic shrinkage and/or plastic cracking in the concrete.

Preferably, the use according to the invention comprises at least one cellulose ether having either,
 a substitution of methoxy radicals (DSM); or
 a degree of substitution (DS)
 from 1.5 to 2.0.

Preferably, the use according to the invention comprises at least one cellulose ether having either,
 a substitution of methoxy radicals (DSM); or
 a degree of substitution (DS)
 from 1.7 to 1.9.

Even more preferably either,
 the degree of substitution of methoxy radicals (DSM); or
 a degree of substitution (DS)
 is equal to 1.8.

Preferably, the cellulose ether used according to the invention has a molecular weight greater than or equal to 300 000 g/mole.

More preferably, the cellulose ether used according to the invention has a molecular weight of from 400 000 g/mole to 1 000 000 g/mole.

Even more preferably, the cellulose ether used according to the invention has a molecular weight of from 700 000 g/mole to 800 000 g/mole.

Preferably, the cellulose ether used according to the invention has a Brookfield viscosity value from 50 to 100 000 mPa·s measured for an aqueous solution at 2%.

More preferably, the cellulose ether used according to the invention has a Brookfield viscosity value of from 50 to 50 000 mPa·s measured for an aqueous solution at 2%

Even more preferably, the cellulose ether used according to the invention has a Brookfield viscosity value of from 100 to 15 000 mPa·s measured for an aqueous solution at 2%.

Preferably, the cellulose ether used according to the invention has a Brookfield viscosity value from 1000 to 10 000 mPa·s measured for an aqueous solution at 2%.

More preferably, the cellulose ether used according to the invention has a Brookfield viscosity value of from 3500 to 4500 mPa·s measured for an aqueous solution at 2%.

Even more preferably, the cellulose ether used according to the invention has a Brookfield viscosity value equal to 4000 mPa·s measured for an aqueous solution at 2%.

The Brookfield viscosity value is measured according to the ASTM Monograph D1347 and D2363 Standard.

The invention provides the use of at least one cellulose ether having either,
 a degree of substitution of methoxy radicals (DSM); or a degree of substitution (DS)

from 1.17 to 2.33 to reduce plastic shrinkage and/or reduce plastic cracking in concrete, the said cellulose ether having a molecular weight greater than or equal to 300 000 g/mole and a Brookfield viscosity value from 50 to 100 000 mPa·s measured for an aqueous solution at 2%

Preferably, the cellulose ether used according to the invention has a molar substitution (MS) value from 0 to 1.

According to a variant of the invention, the cellulose ether used according to the invention is hydroxypropyl methyl cellulose.

According to another variant of the invention, the cellulose ether used according to the invention is hydroxyethyl cellulose.

More preferably, the concentration in the cellulose ether used according to the invention in concrete is from 0.01 to 0.8%, preferably from 0.05 to 0.8% of cellulose ether (% by dry mass of cellulose ether relative to the dry mass of cement).

Preferably, the concentration of the cellulose ether used according to the invention in concrete is from 0.01 to 0.6% of cellulose ether (% by dry mass of cellulose ether relative to the dry mass of cement).

More preferably, the concentration of the cellulose ether used according to the invention in concrete is from 0.01 to 0.5%, preferably from 0.05 to 0.5% of cellulose ether (% by dry mass of cellulose ether relative to the dry mass of cement).

Even more preferably, the concentration of the cellulose ether used according to the invention in concrete is from 0.01 to 0.35%, preferably from 0.05 to 0.35% of cellulose ether (% by dry mass of cellulose ether relative to the dry mass of cement).

According to a variant of the invention, the cellulose ether used according to the invention is the only additive making it possible to reduce or eliminate plastic shrinkage and/or plastic cracking in the said concrete.

Preferably, the cellulose ether used according to the invention is methyl cellulose.

The invention therefore relates to the use of at least one methyl cellulose having either, a degree of substitution of methoxy radicals (DSM); or a degree of substitution (DS)

from 1.17 to 2.33 to reduce plastic shrinkage and/or reduce plastic cracking in concrete.

Preferably, the use according to the invention comprises at least one methyl cellulose having either, a degree of substitution of methoxy radicals (DSM); or a degree of substitution (DS)

from 1.5 to 2.0.

Preferably, the use according to the invention comprises at least one methyl cellulose having either, a degree of substitution of methoxy radicals (DSM); or a degree of substitution (DS)

from 1.7 to 1.9.

Even more preferably, either, the degree of substitution of methoxy radicals (DSM); or a degree of substitution (DS)

is equal to 1.8.

Preferably, the methyl cellulose used according to the invention has a molecular weight greater than or equal to 300 000 g/mole.

More preferably, the methyl cellulose used according to the invention has a molecular weight of from 400 000 g/mole to 1 000 000 g/mole.

Even more preferably, the methyl cellulose used according to the invention has a molecular weight of from 700 000 g/mole to 800 000 g/mole.

Preferably, the methyl cellulose used according to the invention has a Brookfield viscosity value from 50 to 100 000 mPa·s measured for an aqueous solution at 2%.

More preferably, the methyl cellulose used according to the invention has a Brookfield viscosity value of from 50 to 50 000 mPa·s measured for an aqueous solution at 2%.

Even more preferably, the methyl cellulose used according to the invention has a Brookfield viscosity value of from 100 to 15 000 mPa·s measured for an aqueous solution at 2%.

Preferably, the methyl cellulose used according to the invention has a Brookfield viscosity value from 1000 to 10 000 mPa·s measured for an aqueous solution at 2%.

More preferably, the methyl cellulose used according to the invention has a Brookfield viscosity value of from 3500 to 4500 mPa·s measured for an aqueous solution at 2%.

Even more preferably, the methyl cellulose used according to the invention has a Brookfield viscosity value equal to 4000 mPa·s measured for an aqueous solution at 2%.

The Brookfield viscosity value is measured according to the ASTM Monograph D1347 and D2363 Standard.

Preferably, the methyl cellulose used according to the invention has a molar substitution (MS) value from 0 to 1.

More preferably, the concentration of the methyl cellulose used according to the invention in concrete is from 0.01 to 0.8%, preferably from 0.05 to 0.8% of cellulose ether (% by dry mass of cellulose ether relative to the dry mass of cement).

Preferably, the concentration of the methyl cellulose used according to the invention in concrete is from 0.01 to 0.6% of cellulose ether (% by dry mass of cellulose ether relative to the dry mass of cement).

More preferably, the concentration of the methyl cellulose used according to the invention in concrete is from 0.01 to 0.5%, preferably from 0.05 to 0.5% of cellulose ether (% by dry mass of cellulose ether relative to the dry mass of cement).

Even more preferably, the concentration of the methyl cellulose used according to the invention in concrete is from 0.01 to 0.35%, preferably from 0.05 to 0.35% of cellulose ether (% by dry mass of cellulose ether relative to the dry mass of cement). According to this variant, the cellulose ether used according to the invention is not mixed with other additives, which reduce plastic shrinkage and/or reduce plastic cracking in the said concrete, being understood that the said concrete may contain other additives having other functions than that of reducing or eliminating plastic shrinkage and/or plastic cracking.

According to the use according to the invention, the cellulose ethers may also be introduced directly into concrete, in particular into concrete in the drum truck or into each constituent of concrete.

According to the use according to the invention, the cellulose ethers may be introduced in powder form or in dry form directly into the various constituents of concrete whatever their physical states (in the form of powder, paste, liquid or solid).

It is possible to envisage that the cellulose ethers used according to the invention may be introduced in powder form or in dry form directly with the aggregate constituents of the concrete. In this case it is preferably a mix with the aggregates.

According to the use according to the invention, the cellulose ethers may also be introduced in the form of a liquid or semi-liquid solution in the mixing water.

The present invention also relates to a hydraulic binder comprising from 0.05 to 0.8% of at least one cellulose ether (% by dry mass of cellulose ether relative to the dry mass of cement) as an additive to reduce plastic shrinkage and/or plastic cracking.

The present invention also relates to a hydraulic binder comprising from 0.05 to 0.8% of at least one cellulose ether (% by dry mass of cellulose ether relative to the dry mass of cement) as an additive to eliminate plastic shrinkage and/or plastic cracking.

FIG. 1 presents a photo of a concrete made without using cellulose ether according to the invention. It is a control concrete.

Figure 2:
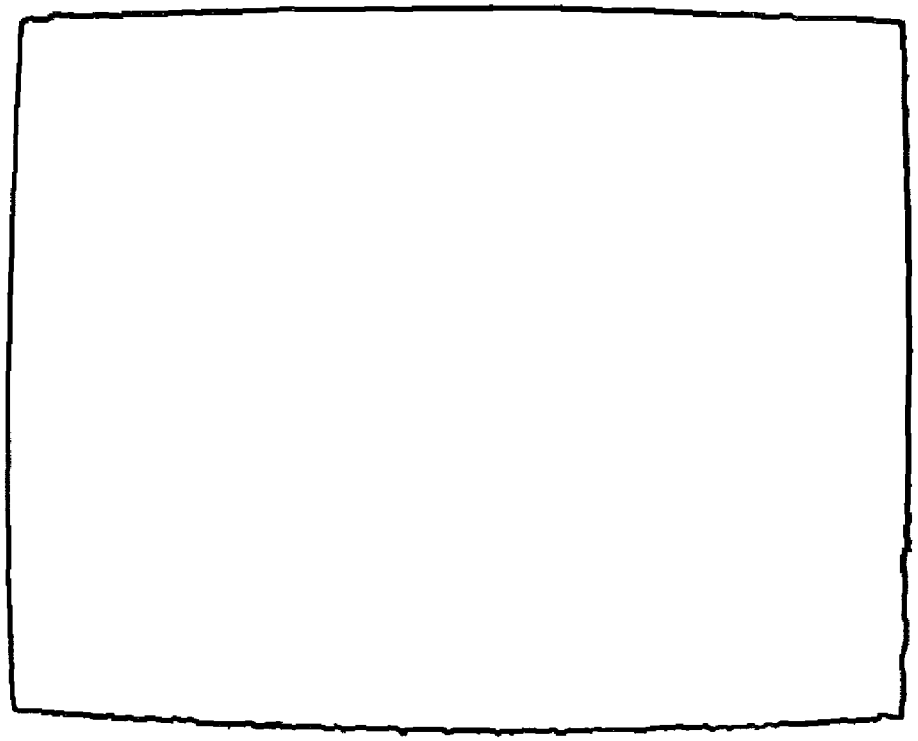

FIG. 2 presents a photo of a concrete made using methyl cellulose according to the invention, at 0.14% by dry mass relative to the dry mass of the cement.

Figure 3:
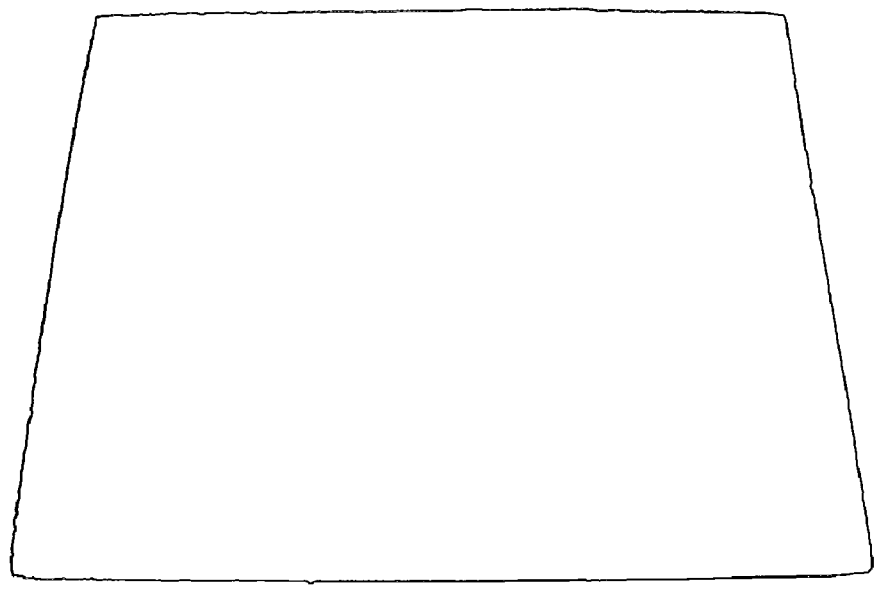

FIG. 3 presents a photo of a concrete made using hydroxypropyl methyl cellulose according to the invention, at 0.35% by dry mass relative to the dry mass of the cement.

Figure 4:
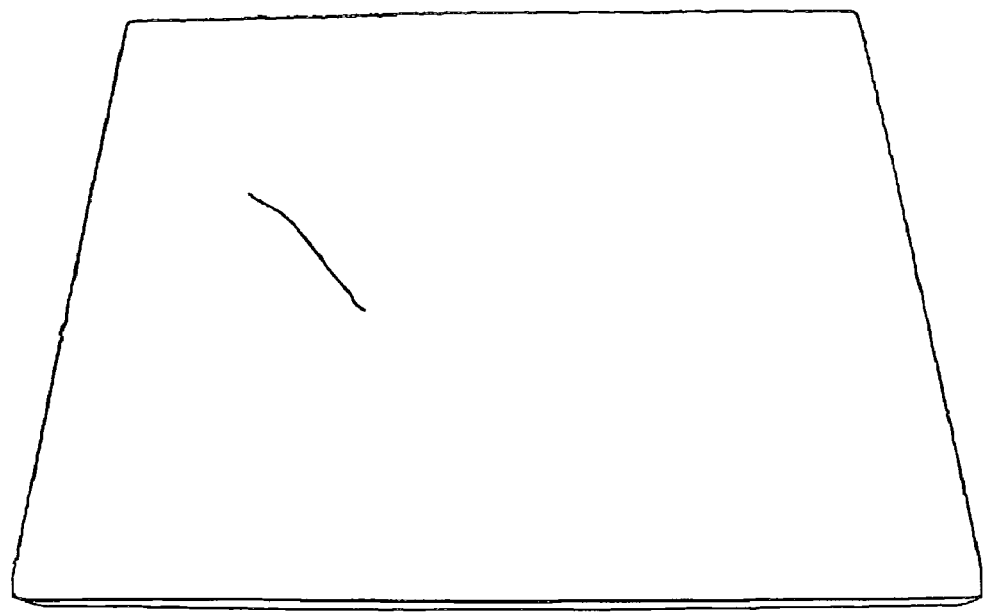

FIG. 4 presents a photo of a concrete made using hydroxypropyl methyl cellulose according to the invention, at 0.20% by dry mass relative to the dry mass of the cement.

Figure 5:
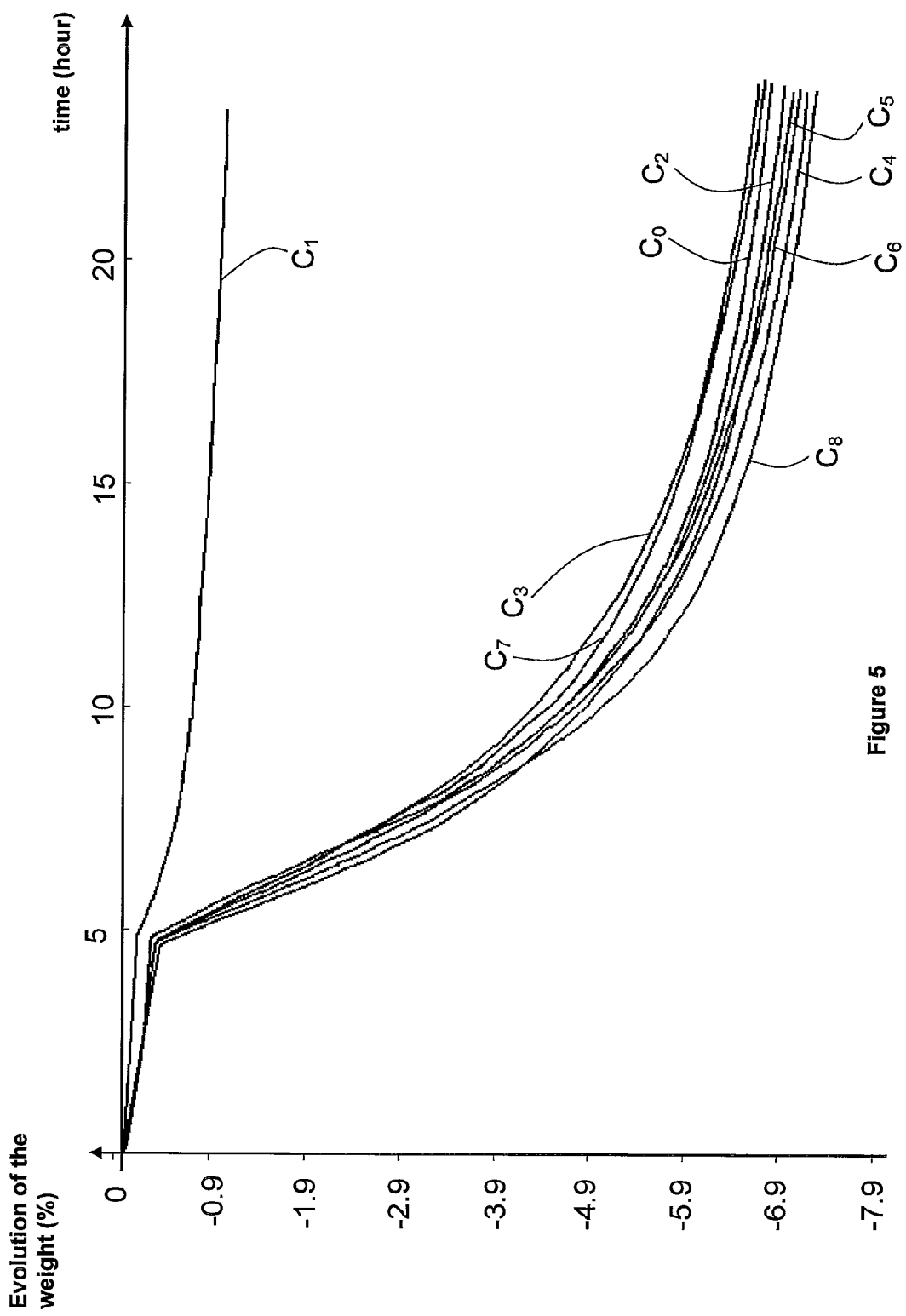

FIG. 5 represents the evolution of the weight of several concrete boards as a function of time.

The following examples illustrate the invention without restricting its scope.

EXAMPLES

1/Constituents of the Concrete:

The following table describes the cellulose ethers used in the examples according to the invention:

| Supplier | Chemical nature | Product Brand name | Degree of Substitution: (DS) or (DSM) | Molar Substitution (MS) |
|---|---|---|---|---|
| Hercules | Hydroxypropyl methyl cellulose (HPMC) | Culminal MHPC 50 Culminal MHPC 100 Culminal MHPC 400 R Culminal MHPC 500 PF | (DSM): from 1.17 to 2.33 | from 0.05 to 0.80 |
| | Hydroxyethyl cellulose | Natrosol 250 LR | (DS) = 2.0 | 2.5 |
| Dow Chemical | Hydroxypropyl methyl cellulose (HPMC) | E4M | (DS) = 1.9 | 0.23 |
| | | F4M | (DS) = 2.9 | 0.13 |
| | Methyl cellulose | Methocel A4M | (DSM) = 1.8 | — |
| | | Methocel A4C | (DSM) = 1.8 | — |

The following cements were used according to the invention:
- cement from the Val d'Azergue cement plant;
- cement from the Saint Pierre La Cour cement plant.

The following other constituents were used according to the invention:
- a mineral limestone filler ($CaCO_3$) of density 2.73;
- a sand with 0/4 grading defined according to the EN 12620 Standard;
- a superplasticizer of the PCP type (PolycarboxylPolyox);
- tap water.

2/Production of the Concrete:
Quantities:

The following table describes the quantities of the constituents used in a concrete mix design according to the invention.

| Constituents | Kg/m³ |
|---|---|
| Portland Cement 52.5N | 280 |
| Sand with a 0/4 grading | 1320 |
| Mineral limestone filler | 380 |
| Polypropylene fibres | 0.750 |
| Superplasticizer | 3.3 to 6.6 |
| Cellulose ether | from 0.14 to 0.98 |
| Effective water | 259.2 |
| Total water | 275 |

Preparation of the Mould:

A wood mould having the following dimensions: L 68.8×w 48.8×H4 cm was reinforced using a non-galvanised metal grid. The grid was attached by iron wires in four zones of the mould.

Production of a Concrete Screed:

The dry raw materials (cement, sand, limestone, polypropylene fibres and cellulose ether) were introduced in the bowl of the mixer and mixed for 2 minutes at a mixing speed of 30 rpm, and at an ambient temperature of approximately 20° C. The mixer was a Rayneri mixer with a maximum capacity of 40 liters and having a planetary type of rotation system.

The total water and the superplasticizer were then introduced into the mixer in 30 seconds maintaining a mixing speed of 30 rpm. The mixing was continued for 5 more minutes and 30 seconds at a mixing speed of 30 rpm.

The speed of the mixer was then increased to reach 70 rpm and the mixing was continued for 2 more minutes.

3/Cracking and Shrinkage Test of the Concrete:

A board of concrete was poured of the following dimensions: 63×49×40 cm. The board was placed in an accelerated evaporation apparatus for 24 hours at an approximate temperature of 35° C. (temperature measured at the surface of the concrete) under ventilation with a flow of air of 2.6 m/s.

The length of the cracks was measured and estimated by linear meter of cracks per m² of concrete surface.

4/Results of the Cracking and Shrinkage Tests of the Concrete:

| Concrete formulated using different cellulose ethers | Dosage (% by dry mass of cellulose ether relative to the dry mass of cement) | Plastic cracking (linear metre of cracks/m² of concrete surface) |
|---|---|---|
| Control (without cellulose ether) | 0 | 5.12-4.47 |
| Culminal MHPC 50 | 0.30 | 0.32 |
| Culminal MHPC 100 | 0.20 | 0.30 |
| Culminal MHPC 400 R | 0.05 | 0.88 |
| Culminal MHPC 500 PF | 0.35 | 0 |

-continued

| Concrete formulated using different cellulose ethers | Dosage (% by dry mass of cellulose ether relative to the dry mass of cement) | Plastic cracking (linear metre of cracks/m² of concrete surface) |
|---|---|---|
| Natrosol 250 LR | 0.35 | 0-0.42 |
| Methocel A4M | 0.14 | 0 |
| Methocel A4C | 0.14 | 1.27 |

5/Water Retention Test in the Concrete:

The applicant has shown that, surprisingly, the reduction and/or elimination of plastic cracking in concrete by using a cellulose ether according to the invention in concrete was not due to better water retention in the concrete at the time of its setting. The applicant has indeed shown that with the cellulose ethers according to the invention, no increase of water retention was observed in the concrete at the setting time and during the following first days after the setting, whilst a reduction, even an elimination of plastic cracking was observed. This was shown with the following test: during the previously described accelerated evaporation phase, the weight of the boards of concrete was measured as a function of time. The loss of weight corresponded to the evaporated water.

| Concrete formulated using different cellulose ethers | Dosage (% by dry mass of cellulose ether relative to the dry mass of cement) | Viscosity (mPa · s) | Evolution curves of the loss of weight relative to the initial weight |
|---|---|---|---|
| Control 1 (without cellulose ether) | 0 | — | $C_0$ |
| Control 2 (without cellulose ether and with a curing compound) | 0 | — | $C_1$ |
| A4M | 0.14 | 400 | $C_2$ |
| A4M | 0.14 | 4000 | $C_3$ |
| A4M (pre-diluted) | 0.14 | 4000 | $C_4$ |
| E4M | 0.14 | 4000 | $C_5$ |
| E4M (pre-diluted) | 0.14 | 4000 | $C_6$ |
| F4M | 0.14 | 4000 | $C_7$ |
| Natrosol 250 LR | 0.14 | 250 | $C_5$ |

The concrete in Control 2 was made without cellulose ether. A quantity of 150 g/m² of the curing compound, commercialised by Chryso under the brand name Chrysocure, was sprayed on the concrete board after the setting.

The other concretes were made by introducing, as previously described, the cellulose ether in powder form, except for the examples for which it was indicated that the cellulose ether was diluted. In that case, the cellulose ether was diluted beforehand in part of the mixing water, the obtained solution being introduced with the remainder of the mixing water.

The accelerated evaporation phase in FIG. 5 started five hours after making the concretes. As shown in FIG. 5, an improvement of the water retention was observed for Control 2 only, which corresponded to a concrete not containing cellulose ether but which was covered by a curing compound, as compared to Control 1, which corresponded to a concrete not containing cellulose ether. In all the examples of concrete containing cellulose ether, a loss of weight was observed, which is to say evaporation of water, similar to the one obtained for Control 1, which corresponded to a concrete not containing cellulose ether. The use of cellulose ethers according to the invention therefore does not induce an increase of water retention in concrete. Surprisingly however, the use of cellulose ethers according to the invention procures a reduction and/or elimination of plastic cracking.

The invention claimed is:

1. A method comprising adding in a concrete composition at least one methyl cellulose ether having either,
    a degree of substitution of methoxy radicals (DSM); or
    a degree of substitution (DS)
    comprised from 1.17 to 2.33 to reduce plastic shrinkage and/or reduce plastic cracking in concrete,
        wherein the at least one methyl cellulose ether has a Brookfield viscosity value from 50 to 20 000 mPa.s measured for an aqueous solution at 2%.

2. The method according to claim 1, wherein the at least one cellulose ether has a molecular weight greater than or equal to 300 000 g/mole.

3. The method according to claim 1, wherein the at least one cellulose ether has a Brookfield viscosity value from 50 to 15000 mPa.s measured for an aqueous solution at 2%.

4. The method according to claim 1, wherein a concentration of the cellulose ether in the concrete is from 0.01 to 0.8% of cellulose ether (% by dry mass of cellulose ether relative to a dry mass of cement).

5. The method according to claim 1, wherein the cellulose ether is the only additive making it possible to reduce plastic shrinkage and/or reduce plastic cracking in said concrete.

6. The method according to claim 1, wherein the at least one cellulose ether has a Brookfield viscosity value from 50 to 10000 mPa.s measured for an aqueous solution at 2%.

7. The method according to claim 1, wherein the at least one methyl cellulose ether is added in the concrete composition in an amount such that substantially all plastic shrinkage and/or plastic cracking is/are eliminated in said concrete without treating said concrete, after pouring, with a curing compound that reduces plastic shrinkage and/or plastic cracking in said concrete.

8. A concrete comprising from 0.01 to 0.8% of at least one methyl cellulose ether (% by dry mass of cellulose ether relative to a dry mass of cement) as an additive to reduce plastic shrinkage and/or reduce plastic cracking, said cellulose ether having either,
    a degree of substitution of methoxy radicals (DSM); or
    a degree of substitution (DS)
    comprised from 1.17 to 2.33,
        wherein the at least one methyl cellulose ether has a Brookfield viscosity value from 50 to 20 000 mPa.s measured for an aqueous solution at 2%.

9. The concrete according to claim 8, wherein the concrete is a fluid or self-placing concrete.

10. The concrete according to claim 8, wherein the at least one cellulose ether has a Brookfield viscosity value from 50 to 15000 mPa.s measured for an aqueous solution at 2%.

11. The concrete according to claim 10, wherein the at least one cellulose ether has a Brookfield viscosity value from 50 to 10000 mPa.s measured for an aqueous solution at 2%.

12. A hydraulic binder comprising 0.01 to 0.8% of at least one methyl cellulose ether (% by dry mass of cellulose ether relative to a dry mass of cement) as an additive to reduce plastic shrinkage and/or reduce plastic cracking, said cellulose ether having either,
    a degree of substitution of methoxy radicals (DSM); or
    a degree of substitution (DS)
    comprised from 1.17 to 2.33,
        wherein the at least one methyl cellulose ether has a Brookfield viscosity value from 50 to 20 000 mPa.s measured for an aqueous solution at 2%.

13. The hydraulic binder according to claim 12, wherein the at least one cellulose ether has a Brookfield viscosity value from 50 to 15000 mPa.s measured for an aqueous solution at 2%.

14. The hydraulic binder according to claim 13, wherein the at least one cellulose ether has a Brookfield viscosity value from 50 to 10000 mPa.s measured for an aqueous solution at 2%.

15. The hydraulic binder according to claim 12, wherein the at least one methyl cellulose ether is in an amount such that substantially all plastic shrinkage and/or plastic cracking is/are eliminated in a concrete made with said binder without treating said concrete, after pouring, with a curing compound that reduces plastic shrinkage and/or plastic cracking in said concrete.

16. A method comprising adding in a concrete composition at least one hydroxypropyl methyl cellulose ether having either,
- a degree of substitution of methoxy radicals (DSM); or
- a degree of substitution (DS)
  comprised from 1.17 to 2.33, and having a non-zero molar substitution (MS) value lower than about 0.8 to reduce plastic shrinkage and/or reduce plastic cracking in concrete, wherein the at least one hydroxypropyl methyl cellulose ether has a Brookfield viscosity value from 50 to 20 000 mPa.s measured for an aqueous solution at 2%.

17. The method according to claim 16, wherein the molar substitution value is lower than about 0.23.

18. The method according to claim 16, wherein the at least one cellulose ether has a Brookfield viscosity value from 50 to 15000 mPa.s measured for an aqueous solution at 2%.

19. The method according to claim 18, wherein the at least one cellulose ether has a Brookfield viscosity value from 50 to 10000 mPa.s measured for an aqueous solution at 2%.

20. A concrete obtained with the method according to claim 16.

21. The method according to claim 16, wherein the at least one hydroxypropyl methyl cellulose ether is added in the concrete composition in an amount such that substantially all plastic shrinkage and/or plastic cracking is/are eliminated in said concrete without treating said concrete, after pouring, with a curing compound that reduces plastic shrinkage and/or plastic cracking in said concrete.

* * * * *